April 3, 1934.    L. STOLTENBERG    1,953,317
POTATO HARVESTING APPARATUS
Filed Aug. 8, 1932    4 Sheets-Sheet 1
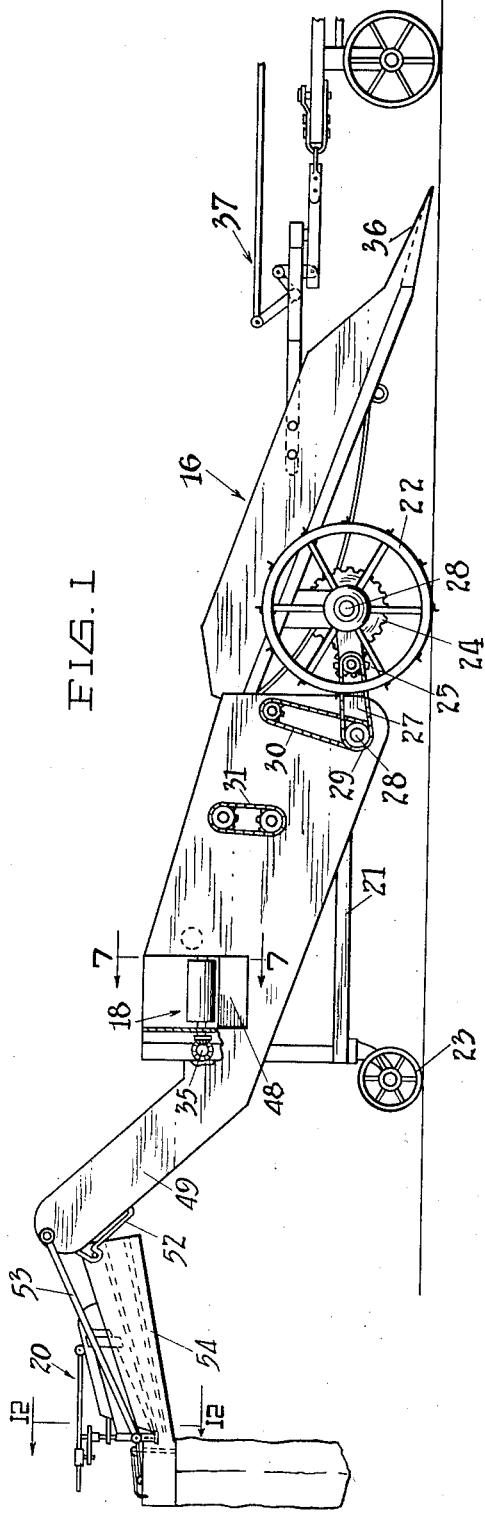
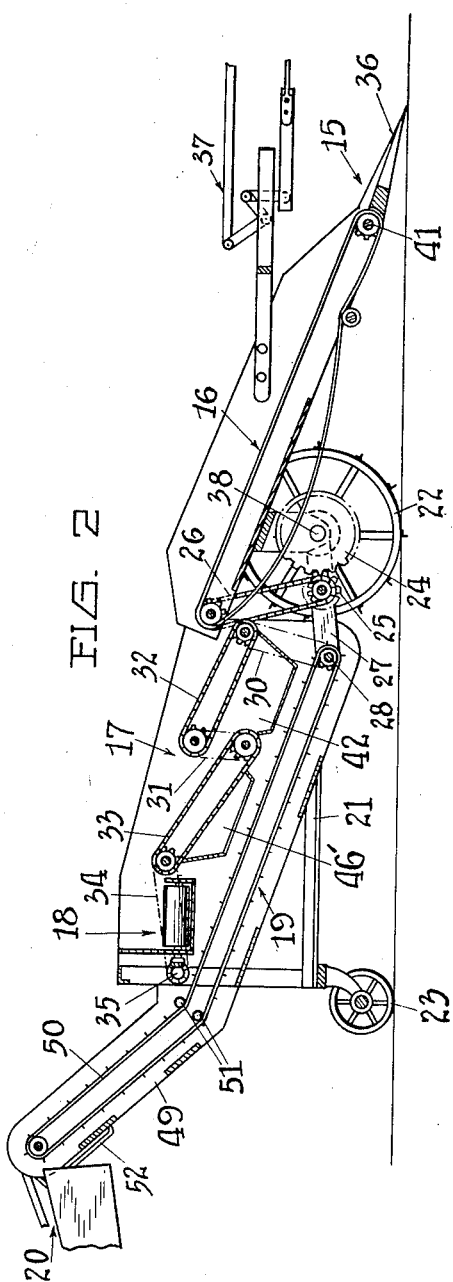
INVENTOR.
LOUIS STOLTENBERG.
BY
ATTORNEY.

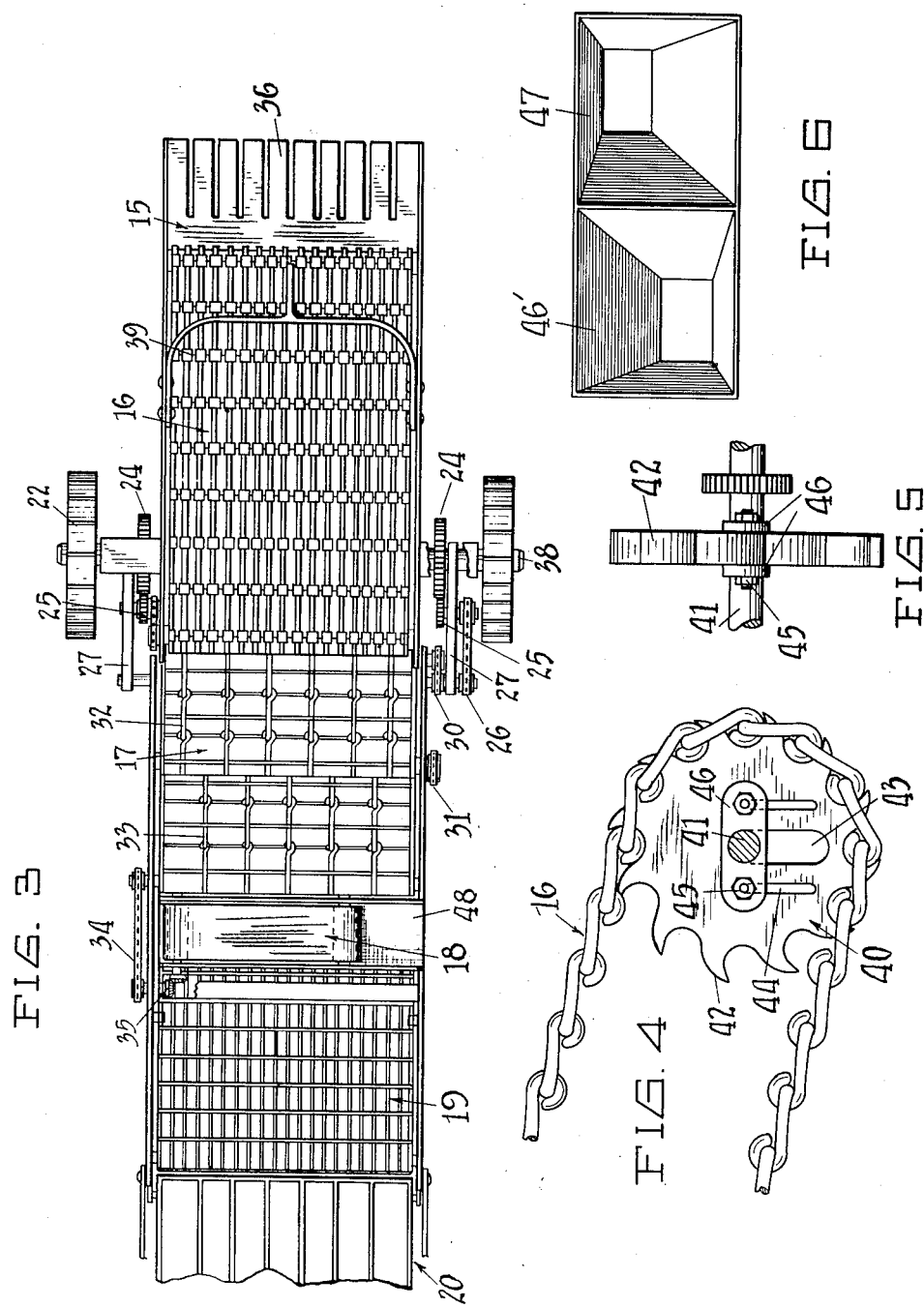

April 3, 1934. L. STOLTENBERG 1,953,317
POTATO HARVESTING APPARATUS
Filed Aug. 8, 1932 4 Sheets-Sheet 3
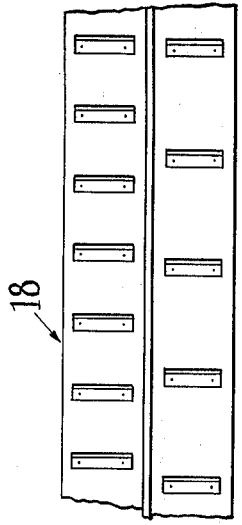
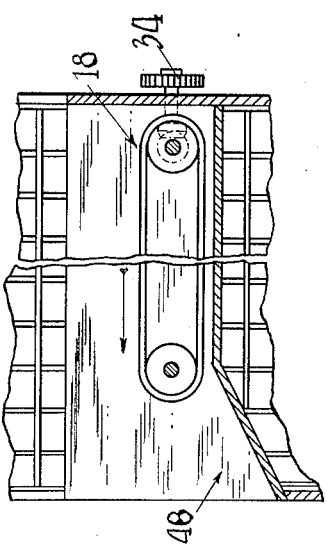
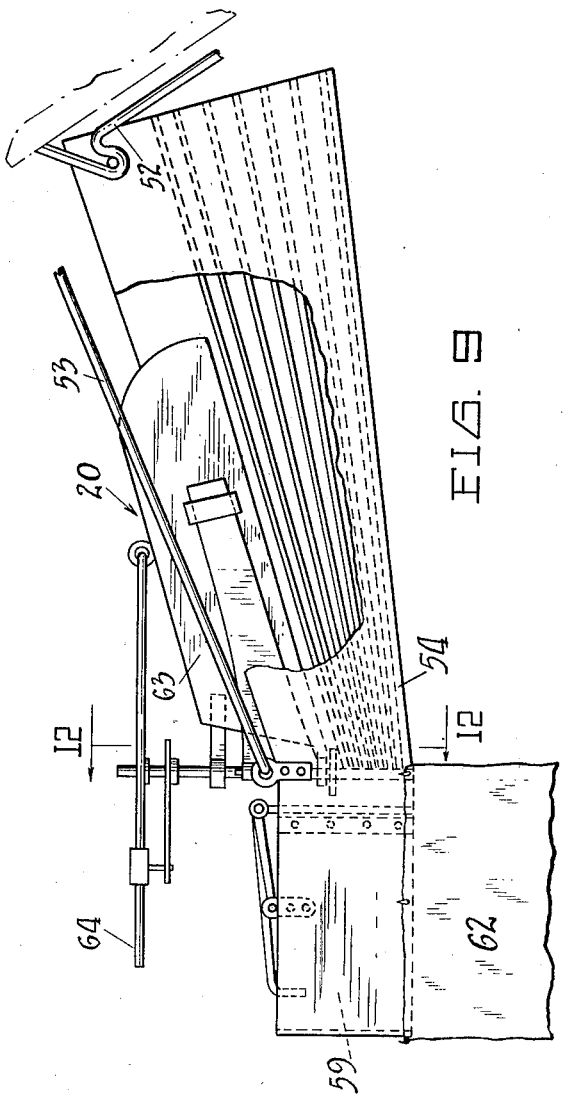
INVENTOR.
LOUIS STOLTENBERG
BY
ATTORNEYS.

April 3, 1934.  L. STOLTENBERG  1,953,317
POTATO HARVESTING APPARATUS
Filed Aug. 8, 1932  4 Sheets-Sheet 4
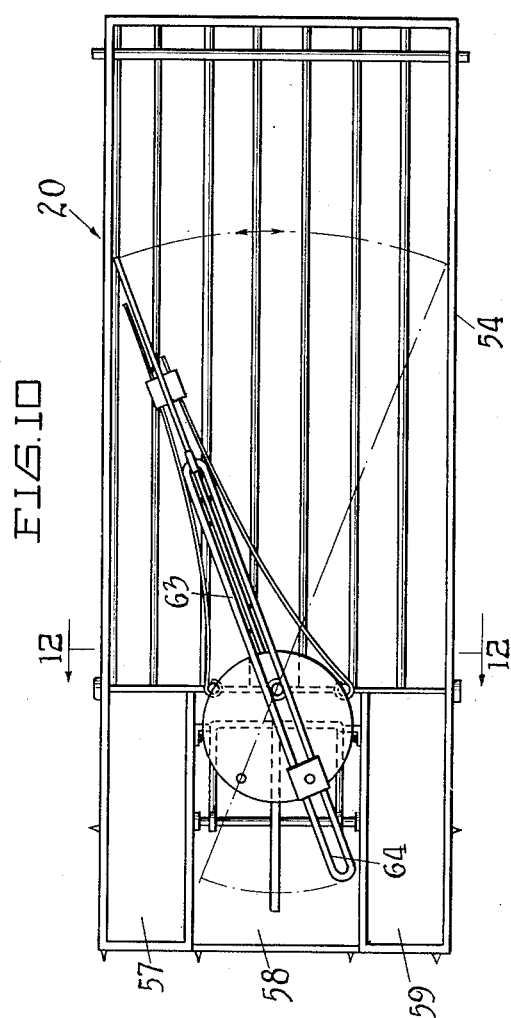
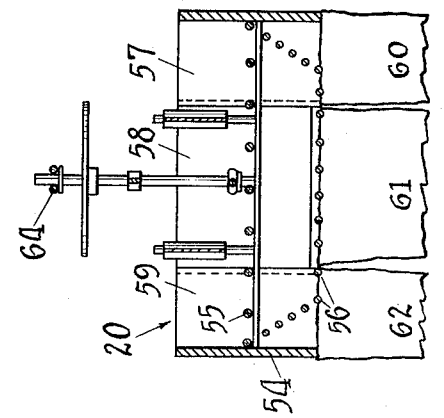
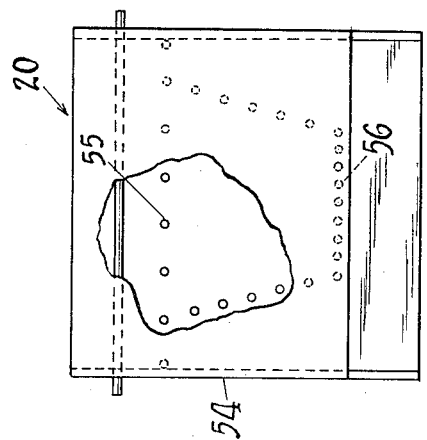
INVENTOR.
LOUIS STOLTENBERG
BY
ATTORNEY.

Patented Apr. 3, 1934

1,953,317

UNITED STATES PATENT OFFICE 1,953,317

POTATO HARVESTING APPARATUS

Louis Stoltenberg, Oakland, Calif.

Application August 8, 1932, Serial No. 627,822

1 Claim. (Cl. 259—1)

The present invention relates generally to agricultural machinery and has particular reference to potato harvesting machines for digging, cleaning, sorting and sacking potatoes in the field in one continuous operation from the digging to the sacking operation.

The principal object of the present invention is that of providing a combined potato harvesting machine of the class indicated that embodies improved mechanism for digging, cleaning, sorting and sacking potatoes in a continuous operation.

A further object of the invention is the provision of a compact, durable, efficient harvester of the class described that is comparatively simple in design and positive in its operation.

A still further object of the invention is the provision of improved means for separating the vines and foreign matter such as rocks and clods of earth as the potatoes are worked through the machine to the sorting and sacking mechanism.

An additional object of the invention is that of providing positive and novel means for co-operative action with the agitating mechanism to cause the positive removal of foreign matter from the potatoes and vines as they are passed rearwardly by the initial conveyor mechanism.

Other objects and advantages of the invention will become apparent with reference to the subjoined specification and the accompanying four sheets of drawings in which:—

Figure 1 is a side elevation showing my improved combined harvester;

Figure 2 is a longitudinal sectional view of the entire machine showing the digging mechanism, conveying and agitating mechanism, vine separating mechanism, potato receiving and conveying mechanism and the sorting and sacking mechanism;

Figure 3 is a plan view of the machine illustrating the co-operative relation of the various conveyor mechanisms;

Figure 4 is an enlarged detail view illustrating the adjustable means for agitating the conveyor mechanism;

Figure 5 is an edge view of the same;

Figure 6 is a top plan view of a twin hopper used in conjunction with the apparatus;

Figure 7 is an enlarged sectional detail of the vine separator mechanism and outlet chute for the vines, the section being indicated by the line 7—7 in Figure 1;

Figure 8 is a plan detail of the vine separator conveyor mechanism;

Figure 9 is an enlarged fragmentary side elevation of the potato sorting and sacking mechanism;

Figure 10 is a top plan view of said mechanism illustrating the swingable gate for diverting the potatoes from one side to the other while changing sacks;

Figure 11 is a front end elevation of said sorting and sacking mechanism; and

Figure 12 is a transverse section of the same taken on the line 12—12 of Figures 1 and 9.

The present invention combines improvements and refinements of elements and combinations thereof as pointed out and specifically claimed in my former patents numbered 1,747,266 and 1,828,261, issued, respectively, February 18, 1930, and October 20, 1931.

In the instant application I have greatly improved the construction of my harvesting apparatus and while it is not the intention to claim mechanisms already specifically covered in said former patents it is the intention to claim all new and improved elements now included in the combination of the co-operating mechanisms.

Referring to the drawings in detail and especially to Figures 1, 2 and 3 thereof, the harvester consists broadly of the potato digging mechanism 15, agitating and conveying mechanism 16, vine separating mechanism 17, vine conveying mechanism 18, potato conveying mechanism 19, and the sorting and sacking mechanism 20.

The machine specifically embodies a suitable frame 21 mounted on the driving wheels 22 and a caster 23, said driving wheels 22 being geared, as indicated at 24, to a sprocket 25 which sprocket is chain connected to the conveyor 16 by means of a chain 26.

A link 27 supports the potato conveyor shaft 28 and said shaft is driven by a chain 29 connected to the driving sprocket. Chains 30 and 31 drive the two elements 32 and 33 constituting the vine separating mechanism 17 and a chain 34 in turn drives the vine conveying mechanism through the media of bevel gears 35, Figures 1 and 3.

The digging mechanism 15 embodies a digger or sharpened share 36 and this mechanism may be adjusted as to working depth by means of the adjustable draft mechanism 37, Figures 1 and 2.

As disclosed in Figures 1 and 2 the conveyor mechanism 16 is mounted above the main axle 38 of the machine and extends forwardly and angularly to the digging share 36, said conveyor provided with rows of potato retaining elements 39 to carry the potatoes rearwardly, as disclosed in Figure 3.

As the potatoes are moved rearwardly by the conveyor 16 it is necessary that they be agitated to remove all foreign matter possible therefrom and for this purpose an agitator mechanism 40 is mounted on the shaft 41 of the conveyor 16, which agitator consists of sprocket wheels 42 having slots 43 arranged therein, Figure 4, also side parallel slots 44 in which bolts 45 are mounted, said bolts being carried by a yoke 46 embracing the shaft 41.

By moving the sprocket wheels 42 off center or eccentric to the shaft 41 and clamping the same in position by means of the clamp bolts 45 an agitating motion will be set up in the conveyor from end to end which agitation will remove all foreign matter such as rocks, clods etc. from the potatoes and vines as they are conveyed toward the conveyors 32 and 33.

When the potatoes and vines leave the conveyor 16 they drop onto the inclined conveyor 32 and most of the potatoes fall through this conveyor onto the conveyor 19, however, any that are still mixed with the vines pass over onto the inclined conveyor 33 and drop through the hopper 46' onto the inclined conveyor 19.

The hopper 46' has integrally formed therewith a hopper 47, Figures 2 and 6, said hoppers tending to distribute and sort the potatoes as they are received from their respective conveyors 33 and 32.

With reference to Figure 3 it will be observed that the conveyor 16 comprises a substantially fine mesh belt while the conveyors 32 and 33 are coarse mesh so that the potatoes will drop through and the vines be retained and carried to the vine conveying mechanism 18 by which they are carried laterally to the chute 46 and ejected from the machine.

It will be obvious that as the potatoes and vines are carried rearwardly and constantly agitated by the conveyor 16 all foreign matter will be removed therefrom and those potatoes still clinging to the vines will be separated therefrom either by the conveyor 32 or 33 due to the fact that the potatoes and vines drop from conveyor to conveyor and are constantly under agitation.

The rear end of the frame 49 is sharply inclined and the upper end 50 of the conveyor 19 is bent to a corresponding angle by means of idler rollers 51 mounted transversely of the frame, Figure 2.

The sacking and sorting mechanism 20 is secured to the upper end of the frame 49 by means of a loop member 52 and a brace rod 53, said mechanism comprising a box like structure 54 having upper spaced bars 55 and lower differently spaced bars 56 so that the potatoes will be graded by the various spaces formed between said bars and then carried rearwardly to the sacking compartments 57, 58 and 59 to which are affixed sacks 60, 61 and 62.

The deflector mechanism 63 is operated from side to side by the handle mechanism 64 to deflect the potatoes from side to side while sacks are being changed by the operator.

The sacking and sorting mechanism 20 has been described briefly only for the reason that it forms the subject matter of one of my former patents hereinbefore mentioned and, therefore, no claim is made to the same in the present application except in a broad sense as included in the combination.

What I claim and desire to secure by Letters Patent of the United States is the following:—

In a potato harvesting machine, a conveyor mechanism therefor including an agitator mechanism, said agitator mechanism including an agitator shaft, sprocket wheels mounted on said shaft and means associated with said sprockets for rendering the same eccentric to said shaft comprising, yokes carried by the shaft and embracing said sprockets, slots in said sprockets, and clamping bolts carried by said yokes and extending through certain of said slots and adapted to rigidly retain said sprockets in adjusted eccentric positions relative to said shaft.

LOUIS STOLTENBERG.